[11] 3,620,592

[72] Inventor Michael Harok.
 Denbigh, Wales
[21] Appl. No. 50,836
[22] Filed June 29, 1970
[45] Patented Nov. 16, 1971
[73] Assignee Pilkington Perkin-Elmer Limited
 Liverpool, England
[32] Priority July 3, 1969
[33] Great Britain
[31] 33,601/69

[54] OPTICAL DISPLAY SYSTEMS
 14 Claims, 3 Drawing Figs.
[52] U.S. Cl. .................................................... 350/9,
 35/12 N, 178/7.88, 350/174, 353/99
[51] Int. Cl. ..................................................G02b23/00,
 G02b 27/10
[50] Field of Search.......................................... 350/169,
 174, 9, 103, 104, 55; 35/12 N; 353/99, 28, 11, 12;
 178/7.85, 7.88; 356/251, 252

[56] References Cited
UNITED STATES PATENTS
| | | | |
|---|---|---|---|
| 2,482,115 | 9/1949 | Laird............................ | 353/99 |
| 3,401,593 | 9/1968 | Altman......................... | 350/157 |
| 3,549,803 | 12/1970 | Becht et al................... | 178/7.88 |
| 3,567,319 | 3/1971 | Gaston ......................... | 350/202 |

Primary Examiner—David Schonberg
Assistant Examiner—Ronald J. Stern
Attorney—Mattern, Ware and Davis ABSTRACT: Collimated light carrying visual information is projected via a partial reflector on to a reflex-reflector which returns the light to the partial reflector for viewing by an observer who sees an image of the visual information at infinity. A flight simulator and a head-up display apparatus employing this system are described.

PATENTED NOV 16 1971

INVENTOR
MICHAEL HAROLD FREEMAN

BY Mattern Ware & Davis
ATTORNEYS

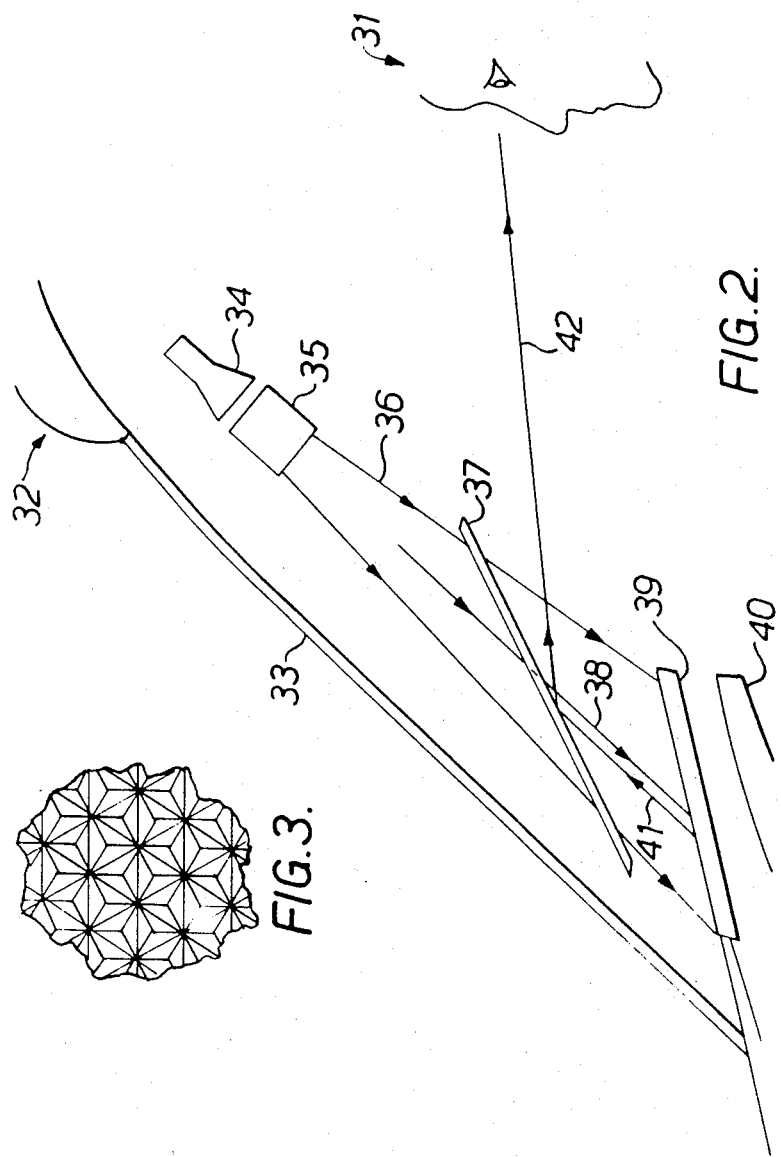

OPTICAL DISPLAY SYSTEMS

BACKGROUND OF THE INVENTION

This invention concerns improvements in or relating to optical systems which provide an observer with a display of visual information effectively located at infinity. A requirement for such systems is found, for example, in visual attachments to flight simulators and in head-up display systems, and in numerous other applications.

Display systems often require optical projection techniques which provide, over fields of view which may be large but not exclusively so, a representation of a scene or other information which has a resolution better than or near to that of the human eye and which is effectively located at infinity.

It is an object of the present invention to provide an optical system which can be used in such a display system.

SUMMARY OF THE INVENTION

According to the present invention there is provided an optical system for displaying visual information comprising projection means adapted to project collimated light carrying information to be displayed, partial reflector means positioned to receive light from the projection means, and reflex-reflector means positioned to receive light from the partial reflector means and adapted to reflect light incident on the reflex-reflector means in a direction opposite to its direction of incidence back towards the partial reflector means so that an observer viewing in a direction towards the partial reflector means can see an image, which appears at infinity, of said information. Light from the projection means may be reflected by the partial reflector means towards the reflex-reflector means, and light reflected from the reflex-reflector means may be transmitted through the partial reflector means towards the observer. Alternatively light from the projection means may be transmitted through the partial reflector means towards the reflex-reflector means, and light reflected from the reflex-reflector means may be reflected by the partial reflector means towards the observer. If desired, there may be provided two reflex-reflector means arranged so that light from the projection means transmitted through the partial reflector means is reflected by one reflex-reflector means back to the partial reflector means for reflection therefrom towards the observer, and so that light from the projection means reflected by the partial reflector means is reflected by the other reflex-reflector means back to the partial reflector means for transmission therethrough towards the observer.

By 'reflex-reflector means' is meant means capable of reflecting image carrying light beams effectively projected through a finite aperture over a finite field angle in a manner such that each reflected light beam travels in substantially the opposite direction to its direction of incidence, and the reflected light is capable of use to form an image having no substantial loss of resolution and no substantial increase of distortion with respect to the image carried by the incident light. The term 'reflex-reflector means' thus includes as examples, and without limitation thereto:

i. A specularly reflecting mirror which reflects in a reflex manner rays incident on the mirror in a direction normal to its surface, or rays contained in a symmetrical cone the principal ray of which is incident on the mirror in a direction normal to its surface. The mirror may be spherical and concave with its center of curvature coinciding with the center of said finite aperture. The reflecting surface need not be fully specular and a diffusing component may be introduced so as to provide an exit aperture larger than the entrance aperture.

ii. Corner cube reflectors, and particularly an array of corner cube reflectors, which reflect light rays in a direction parallel to their direction of incidence but generally shifted laterally by an amount dependent on the corner cube dimensions. By providing an array which covers a large area, but in which each corner cube reflector is small, each individual ray shift can be made small.

iii. A cat's-eye array, for example a beaded screen, which comprises, in effect, a multiplicity of lenses backed by a reflex-reflector means, which latter may comprise example (i) or example (ii) above, or may itself comprise a cat's-eye array.

The reflex-reflector means is preferably adapted to reflect light in a direction opposite to its direction of incidence with minimal divergence of the reflected light and, in particular, to maintain an angular relationship between an incident and a reflected ray of less than 5 milliradians. The reflex-reflector means may comprise an array of optical elements such as, for example, an array of lenses arranged in front of concave mirrors, or an array of corner cube reflectors.

The projection means can have a relatively wide angle of projection from an effective aperture, and the observer's view of the information need not be affected by an image of the effective aperture of the projection system since such image can effectively be located at or near the position of the observer. Thus the projection means may project diverging beams of collimated light and the reflex-reflector means may return the light in converging mode towards the observer.

The present invention further provides an optical system for displaying visual information to an observer comprising primary projection means adapted to project light carrying information to be displayed, primary partial reflector means positioned to receive light from the primary projection means, primary reflex-reflector means positioned to receive light from the primary partial reflector means so that an image of the information is formed on the primary reflex-reflector means, the latter being adapted to reflect light incident thereon generally in a direction opposite to the direction of incidence but to effect divergence of the reflected light such that diverging light bundles are reflected from each image point, secondary projection means positioned to receive said diverging light bundles and to project collimated light, secondary partial reflector means positioned to receive light from said secondary projection means, and secondary reflex-reflector means positioned to receive light from said secondary partial reflector means, said secondary reflex-reflector means being adapted to reflect light incident thereon in a direction opposite to the direction of incidence back towards said secondary partial reflector means so that an observer viewing in a direction towards said secondary partial reflector means can see an image, which appears to be at infinity, of said information.

Preferably light from the primary projection means is reflected from the primary partial reflector means towards the primary reflex-reflector means, and light reflected from the latter is transmitted through the primary partial reflector means to the secondary projection means. Similarly, light from the secondary projection means is preferably reflected from the secondary partial reflector means in a direction away from the observer towards the secondary reflex-reflector means, and light reflected from the latter is transmitted through the secondary partial reflector means towards the observer. If desired, however, the primary and/or the secondary partial means may be arranged so that light from the respective projection means is transmitted through the partial reflector means towards the respective reflex-reflector means, and so that light reflected from the reflex-reflector means is reflected from the partial reflector means towards the secondary projection means or the observer respectively. If desired, there may be provided two reflex-reflector means associated with the primary and/or the secondary partial reflector means and arranged so that light from the respective projection means transmitted through and reflected from the partial reflector means is returned to the latter by reflex-reflector means.

By forming an image on said primary reflex-reflector means and arranging the latter to effect divergence of the reflected light, a relatively large aperture of said secondary projection means can be substantially filled with light, even when the light projected by said primary projection means is from a relatively small aperture. It will be appreciated that the optimum degree of divergence to be effected by said primary reflex-reflector means is dependent on the particular system and the apertures involved, but the divergence is preferably within the range of 10° to 30°. The primary reflex-reflector means may, for example comprise a beaded screen.

Said secondary reflex-reflector means is preferably arranged to reflect light incident thereon in a direction opposite to the direction of incidence with minimal divergence of the reflected light, and in particular to maintain an angular relationship between an incident and a reflected ray of less than 5 milliradians.

Said primary partial reflector means may comprise a plane partial reflector, and may be arranged to have differing reflection/transmission characteristics over different parts of its area such as to achieve substantially uniform light transmission to said secondary projection means.

Said primary projection means may project light from a source which emits light information signals, for example a cathode ray tube, a transparent film through which light is shown, a semiconductor or electroluminescent or other bright object, and the object may be fixed or may be capable of simulating motion by a successive framing technique, or by actual or optically generated apparent movement of the object, or a combination of these.

The present invention specifically comprehends a flight simulator incorporating an optical system as set forth above, and a head-up display apparatus incorporating an optical system as set forth above.

BRIEF DESCRIPTION OF THE DRAWINGS

Apparatus in accordance with the invention will now be described, by way of example, with reference to the accompanying drawings, in which:

FIG. 2 is a schematic view of a head-up display apparatus, and

FIG. 3 is a schematic frontal view of part of a reflex-reflector.

DETAILED DESCRIPTION

Figure 1:
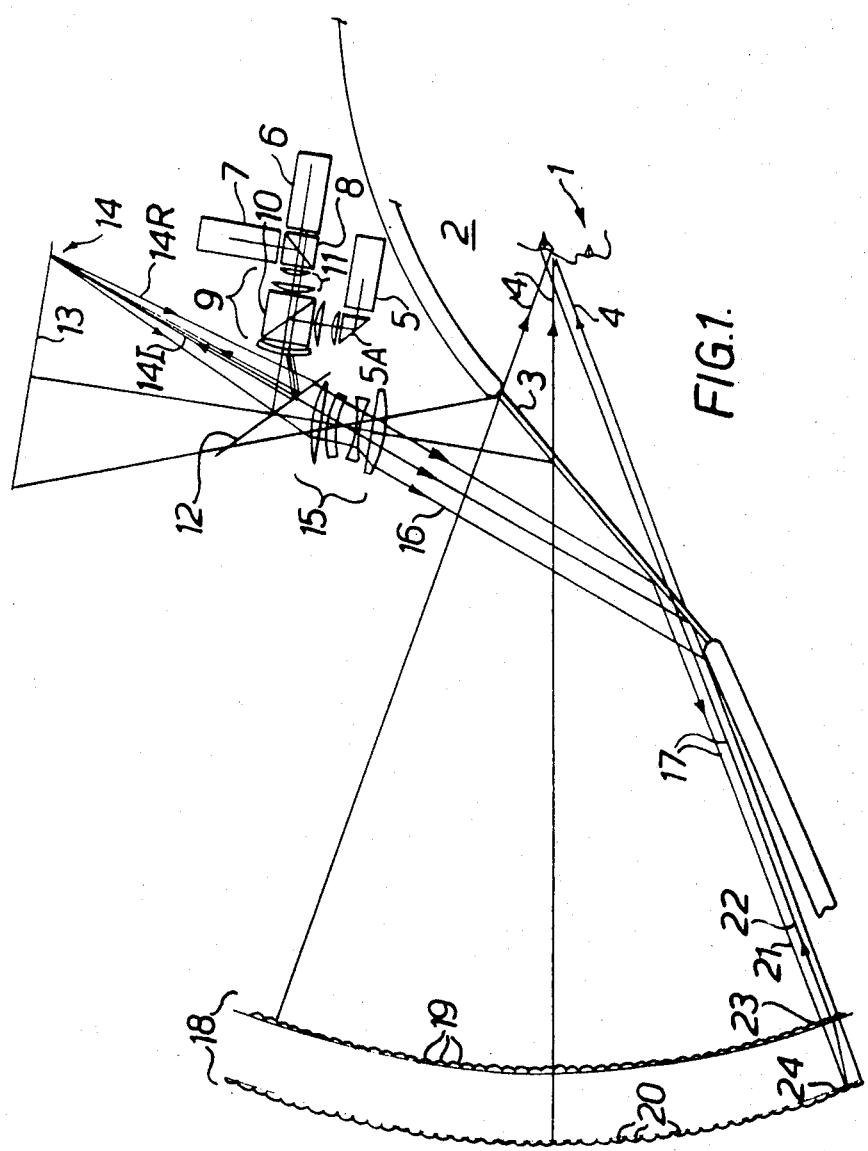
FIG. 1 is a schematic view of a flight simulator.

FIG. 1 shows a flight simulator in which a pilot 1, seated at the controls of a flight deck 2, looks through a windshield 3 to see a simulation of an outside scene which is made to correspond as closely as possible to the real scene he would actually see if correspondingly seated in a real aircraft. Since the real scene would be distant, so that light from each object point would be collimated, light 4 from each object point of the simulated scene should correspondingly be collimated, and this is achieved in the simulator by an optical system as follows.

The source of visual information for providing the simulated scene comprises a group of three cathode ray tubes 5, 6 and 7 having phosphors of different colors, notably red, green and blue respectively. The effective size of the cathode-ray tubes, i.e. the size of the colored images shown thereon, may be from about 1 inch diagonal up to about 23 inches diagonal, and in the particular example shown and described the size is selected to be about 5 inches diagonal.

To produce the simulated scene it is necessary to combine the respective colors from the three tubes 5, 6 and 7, and to collimate the emitted light. In the described embodiment these actions are done separately so that a large exit pupil can more easily be obtained.

Light from the cathode ray tubes 6 and 7 is combined by an appropriate beam splitter 8 effective to transmit light from the tube 6 and reflect light from the tube 7. The combined light then passes to a projector lens 9. Light from the cathode ray tube 5 is directed, by reflection through a prism 5A, to an appropriate beam splitter 10 disposed between components of the lens 9, the beam splitter 10 reflecting light from the tube 5 and transmitting the combined light from the tubes 6 and 7. The components of the lens 9 disposed between the beam splitters 8 and 10 are repeated, as indicated at 11, between the beam splitter 10 and the prism 5A, so that light from the tube 5 is subjected to the same action as that from the tubes 6 and 7. In this manner, the light issuing from the lens 9 is combined light from the tubes 5, 6 and 7.

The lens 9 is of the inverted telephoto variety which provides a relatively narrow cone of rays for each image point, and if these narrow cones of rays were used directly by the subsequent optics, the tendency would be to generate a very small exit pupil requiring the pilot to fix his head in a given limited position. To avoid such limitation the lens 9 is arranged to project a real image 14, via a partial reflector or beam splitter 12, on to a reflex-reflector screen 13. In the particular embodiment shown and described by way of example, the screen 13 is a "Scotchlite" or "beaded" screen adapted to reflect light generally in the opposite direction to its direction of incidence but to effect some spreading to give a cone of reflected rays which is broader than the cone of incident rays. This is illustrated in FIG. 1 by a cone 14I of incident rays and a cone 14R of reflected rays.

Light incident on the screen 13 is reflected thereto by the beam splitter 12, and light reflected from the screen 13 is transmitted through the beam splitter 12 to an image projection lens 15. Due to the cone spreading action of the reflex-reflector screen 13, the lens 15 can have a relatively large aperture which can be filled by the light received thereby. The degree of divergence effected by the screen 13 is selected in accordance with the particular components used in the system, and is preferably in the range 10° to 30°, for example about 12°. The lens 15 is positioned so that its focal plane coincides with the image 14 on the screen 13, whereby collimated light 16 is projected by the lens 15 from each image point on the screen 13.

In FIG. 1 the screen 13 is shown as being flat. This screen may, however, be curved, and in particular spherical, with suitable design of the lenses 9 and 15. It will be appreciated, also, that the screen 13 described as a "Scotchlite" or "beaded" screen could be some other form of reflex-reflector.

The collimated light 16 from the lens 15 is incident on the windshield 3 which is partially reflecting to act as a beam splitter. If preferred, a separate partial reflector or beam splitter could be provided but conveniently the windshield itself can serve the purpose. Some of the light is thus reflected by the windshield, as indicated as 17, and travels, still collimated, away from the pilot 1. This light travels to a reflex-reflector generally indicated as 18, which comprises a retroarray having, in the embodiment shown by way of example, an array of lenses 19 backed by an array of concave mirrors 20. As a further example, the retroarray could comprise an array of small corner-cube reflectors as schematically shown in FIG. 3.

The action of the retroarray is as follows with reference, for ease of explanation, to a single ray 21 contained in a collimated pencil of light 17 incident thereon. The light 12 is refracted by the lens of the array 19 which it strikes, such lens being indicated as 23, and imaged on to the mirror, indicated as 24, of the array 20 which is behind the lens 23. The light reflected by this mirror 24 is refracted again by the lens 23 and issues therefrom as a returning ray 22 travelling parallel to the incident ray 21.

Thus, narrow pencils of collimated light incident on the retroarray are each returned as a narrow pencil of collimated light travelling in the opposite direction, each pencil corresponding to one image point. Light returned from the retroarray is transmitted through the windshield 3 to the pilot 1, who therefore sees an image of the projected scene, the latter appearing at a distance in a manner similar to a real outside scene due to the collimated state of the light the pilot receives from each image point.

The retroarray 18 is arranged to return the light in a manner such that the accuracy of parallelism between an incident ray 21 and the reflected ray 22 is near the visual acuity of the human eye, i.e. the angular relationship between an incident ray and the reflected ray is less than 5 milliradians. The mirrors in the array 20 may be of a specular diffusing or reflex type, but act in each case to return the light imaged by a lens of the array 19 back to that lens. In FIG. 1 the mirrors 20 are shown as spherical, but could be aspheric. The lenses in the array 19, the mirrors in the array 20, being small, produce a correspondingly small lateral shift between an incident ray 21 and the returned ray 22. As shown in FIG. 1 the arrays of lenses 19 and mirrors 20 are spherically curved about a center of curvature substantially coinciding with the pilot's mean head position. In practice, if the flight simulator is to accommodate two pilots or observers seated side by side, this center of curvature is arranged substantially midway between the mean head positions.

It will be appreciated that the beam splitters 3, 8, 10 and 12 in the system should have reflectance values, in relation to color polarization and angle of incidence, selected to produce optimum results with particular regard to light utilization, and the system may incorporate extra polarizing elements, such as quarter wave plates, which, acting with the beam splitters, produce better light utilization.

FIG. 2 shows a head-up display apparatus using a system in accordance with the invention. In this embodiment a pilot 31 seated at the flight deck of a real aircraft 32 views the outside scene through a windshield 33. A cathode ray tube 34 provides a source of visual information which is to be superimposed on the pilot's view. A collimating lens 35 is positioned in front of the tube 34 with its focal plane coincident with the tube's face. COllimated light, indicated as 36, from each object point is thus projected by the lens 35. A partially reflecting mirror or combiner 37 is positioned across and inclined to, the beam of light 36. Light transmitted through the combiner 37, of which a ray is indicated as 38, strikes a reflex-reflector in the form of a retroarray 39 located above the combing 40 of the aircraft flight deck. The retroarray 39 may, for example, comprise an array of lenses backed by an array of mirrors, essentially as described more fully in relation to the retroarray 18 of FIG. 1, or may, as a further example, comprise an array of corner-cube reflectors as schematically shown in FIG. 3. The action of the retroarray 39 is to return light in the opposite direction to its direction of incidence; thus, the illustrative incident ray 38 is returned as a parallel ray 41. Some of the light returned by the retroarray 39 is reflected by the combiner 37 to travel, as indicated at 42, towards thepilot's eyes. Since the light received by the pilot from each object point is collimated (i.e. the light incident on the retroarray, the light returned therefrom, and hence the light reflected from the combiner is collimated), the pilot sees an image at infinity of the visual information displayed on the cathode-ray tube 34, such image being superimposed on his view of the outside scene through the combiner 37 and windshield 33 substantially without parallax errors.

In the embodiment of FIG. 1 light used by the system is reflected by the beam splitter 12 towards the reflex-reflector 13, and returned by the latter for transmission through the beam splitter 12; similarly useful light is reflected by the beam splitter 3 towards the reflex-reflector 18 and returned by the latter for transmission through the beam splitter 3. In the embodiment of Fig. 2 the converse applies in that useful light is transmitted through the combiner 37 to the reflex-reflector 29 and returned by the latter for reflection by the combiner 37. It will be appreciated that in some circumstances, notably where light wastage must be reduced as much as possible, these converse cases can advantageously be combined by providing two reflex-reflectors in association with a beam splitter, and arranged so that light initially transmitted by the beam splitter, and arranged so that light initially transmitted by the beam splitter strikes one reflex-reflector to be returned to the beam splitter for reflection thereby, and light initially reflected by the beam splitter strikes the other reflex-reflector to be returned to the beam splitter for transmission therethrough. With this arrangement light initially transmitted, or initially reflected, by the beam splitter need not be totally lost.

What is claimed is:

1. An optical system for displaying visual information comprising projection means adapted to project collimated light carrying information to be displayed, partial reflector means positioned to receive light from the projection means, and reflex-reflector means positioned to receive light from the partial reflector means and adapted to reflect light incident on the reflex-reflector means in a direction opposite to its direction of incidence back towards the partial reflector means so that an observer viewing in a direction towards the partial reflector means can see an image, which appears at infinity, of said information.

2. An optical system as claimed in claim 1 wherein said partial reflector means and said reflex-reflector means are so disposed that light from the projection means is reflected by the partial reflector means towards the reflex-reflector means, and light reflected from the reflex-reflector means is transmitted through the partial reflector means towards the observer.

3. An optical system as claimed in claim 1 wherein said reflex-reflector means is adapted to maintain an angular relationship between an incident and a reflected ray of less than 5 milliradians.

4. An optical system as claimed in claim 3 wherein said reflex-reflector means comprises an array of lenses arranged in front of concave mirrors.

5. An optical system as claimed in claim 3 wherein said reflex-reflector means comprises an array of corner-cube reflectors.

6. An optical system as claimed in claim 1 wherein said projection means is arranged to project diverging beams of collimated light, and said reflex-reflector means is arranged to return the light in converging mode.

7. An optical system as claimed in claim 1 wherein said partial reflector means and said reflex-reflector means are so disposed that light from the projection means is transmitted through the partial reflector means towards the reflex-reflector means, and light reflected from the reflex-reflector means is reflected by the partial reflector means towards the observer.

8. An optical system for displaying visual information to an observer comprising primary projection means adapted to project light carrying information to be displayed, primary partial reflector means positioned to receive light from the primary projection means, primary reflex-reflector means positioned to receive light from the primary partial reflector means so that an image of the information is formed on the primary reflex-reflector means, the latter being adapted to reflect light incident thereon generally in a direction opposite to the direction of incidence but to effect divergence of the reflected light such that diverging light bundles are reflected from each image point, secondary projection means positioned to receive said diverging light bundles and to project collimated light, secondary partial reflector means positioned to receive light from the secondary projection means, and secondary reflex-reflector means positioned to receive light from the secondary partial reflector means, said secondary reflex-reflector means being adapted to reflect light incident thereon in a direction opposite to the direction of incidence back towards said secondary partial reflector means so that an observer viewing in a direction towards said secondary partial reflector means can see an image, which appears to be at infinity, of said information.

9. An optical system as claimed in claim 8 wherein said primary reflex-reflector means comprises a beaded screen.

10. An optical system as claimed in claim 8 wherein the primary partial reflector means and the primary reflex-reflector means are so disposed that light from the primary projection means is reflected from the primary partial reflector means towards the primary reflex-reflector means, and light reflected from the latter is transmitted through the primary partial reflector means to the secondary projection means.

11. An optical system as claimed in claim 8 wherein the secondary partial reflector means and the secondary reflex-reflector means are so disposed that light from the secondary projection means is reflected from the secondary partial reflector means towards the secondary reflex-reflector means, and light reflected from the latter is transmitted through the secondary partial reflector means to the observer.

12. An optical system as claimed in claim 8 wherein said primary reflex-reflector means is adapted to effect a divergence of at least 10° of light reflected therefrom.

13. An optical system as claimed in claim 8 wherein said primary reflex-reflector means is adapted to effect a divergence of no more than 30° of light reflected therefrom.

14. An optical system as claimed in claim 8 wherein said secondary reflex-reflector means is adapted to maintain an angular relationship between an incident and a reflected ray of less than 5 milliradians.

* * * * *

UNITED STATES PATENT OFFICE
CERTIFICATE OF CORRECTION

Patent No. 3,620,592          Dated November 16, 1971

Inventor(s)  Michael Harold Freeman

It is certified that error appears in the above-identified patent and that said Letters Patent are hereby corrected as shown below:

Column 2, Line 57, after "partial" insert --reflector--

Column 5, Line 29, "COllimated" should be --Collimated--

Column 5, Line 44, separate the combined words --thepilot's--

Column 5, Line 61, "29" should be --39--

Column 5, Lines 66 & 67 delete --and arranged so that light initially transmitted by the beam splitter,--

Signed and sealed this 23rd day of May 1972.

(SEAL)
Attest:

EDWARD M. FLETCHER, JR.          ROBERT GOTTSCHALK
Attesting Officer                Commissioner of Patents